(12) United States Patent
Cudak et al.

(10) Patent No.: US 12,452,515 B2
(45) Date of Patent: Oct. 21, 2025

(54) SYSTEM AND METHOD FOR OPERATING A CAMERA BASED ON CONTEXT DATA

(71) Applicant: LENOVO (SINGAPORE) PTE. LTD., Singapore (SG)

(72) Inventors: Gary D. Cudak, Raleigh, NC (US); Nathan Peterson, Oxford, NC (US); John M. Petersen, Forest, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 245 days.

(21) Appl. No.: 18/192,150

(22) Filed: Mar. 29, 2023

(65) Prior Publication Data

US 2024/0334038 A1 Oct. 3, 2024

(51) Int. Cl.
*H04N 23/61* (2023.01)
*G06V 10/75* (2022.01)
*G06V 10/94* (2022.01)
*H04N 23/63* (2023.01)
*H04N 23/67* (2023.01)
*H04N 23/69* (2023.01)

(52) U.S. Cl.
CPC ............ *H04N 23/61* (2023.01); *G06V 10/75* (2022.01); *G06V 10/95* (2022.01); *H04N 23/631* (2023.01); *H04N 23/635* (2023.01); *H04N 23/675* (2023.01); *H04N 23/69* (2023.01)

(58) Field of Classification Search
CPC .... H04N 23/61; H04N 23/631; H04N 23/635; H04N 23/675; H04N 23/69; H04N 23/64; G06V 10/75; G06V 10/95
See application file for complete search history.

(56) References Cited

U.S. PATENT DOCUMENTS

| 2014/0049652 A1* | 2/2014 | Moon | H04N 23/63 |
| | | | 348/207.1 |
| 2015/0229838 A1* | 8/2015 | Hakim | H04N 23/634 |
| | | | 348/333.02 |
| 2016/0142626 A1* | 5/2016 | Bostick | H04N 23/661 |
| | | | 348/207.11 |

* cited by examiner

*Primary Examiner* — Nicholas G Giles
(74) *Attorney, Agent, or Firm* — Dean D. Small; The Small Patent Law Group, LLC

(57) ABSTRACT

An electronic device for capturing images is provided that can include a camera and one or more processors. The electronic device can also include a memory storing program instructions accessible by the one or more processors. Responsive to execution of the program instructions, the one or more processors are configured to obtain context data for a scene in a field of view (FOV) of the camera of the electronic device, identify an object in the FOV based on the context data; and provide instructions related to the FOV or operate the camera to adjust the FOV based on the object identified.

20 Claims, 3 Drawing Sheets

SYSTEM AND METHOD FOR OPERATING A CAMERA BASED ON CONTEXT DATA

FIELD

The present disclosure relates generally to methods, devices, and systems for capturing images selected by a user of an imaging device.

BACKGROUND OF THE INVENTION

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

It is common for smartphones, tablets, laptop computers, and other electronic devices to include a display surface and at least one camera (e.g., digital camera units (DCUs)). In fact, taking photos and videos is among the most common uses for such electronic devices. Often users have multiple objects that they would like to capture in an image or video. As an example, when taking a selfie with an object, such as a monument, landmark, or the like, achieving the required focus to obtain a picture or video that clearly shows both the individual, and the object is difficult. In addition, complicating matters further can be environmental conditions such as sun glare, overcast clouds, a cluttered background, etc., causing capturing a good image nearly impossible. As a result, individuals must spend a significant amount of time to get a good image, or alternatively, after an event has already occurred an individual is disappointed in the images and video captured, making the electronic device use experience unsatisfactory.

Accordingly, a need exists for improved methods and system for capturing images.

SUMMARY

In accordance with embodiments herein, a method for capturing images with an electronic device is provided. The method includes, under control of one or more processors configured with specific executable program instructions obtaining context data for a scene in a field of view (FOV) of a camera of an electronic device, and identifying an object in the FOV based on the context data. The method also includes providing instructions or operating the camera based on the object identified.

Optionally, obtaining the context data can include obtaining a manual input related to the object. In one aspect, the manual input can be provided by touching an output screen of the electronic device. In another aspect, obtaining the context data can include obtaining the context data from a sensor of the electronic device. In one example, identifying the object in the FOV can include selecting candidate objects within the FOV and comparing the candidate objects to database objects in a database of the electronic device. In another example, identifying the object in the FOV can include selecting candidate objects within the FOV and communicating over a network regarding at least one candidate object of the candidate objects.

Optionally, providing instructions or operating the camera based on the object identified can include displaying the instructions on an output screen. In one aspect, the instructions can be at least one of a symbol, arrow, word, or phrase. In another aspect, providing instructions or operating the camera based on the object identified can include varying operation of the camera. In one example, varying the operation of the camera includes varying focus of the camera.

In accordance with embodiments herein, an electronic device for capturing images is provided that can include a camera and one or more processors. The electronic device can also include a memory storing program instructions accessible by the one or more processors. Responsive to execution of the program instructions, the one or more processors are configured to obtain context data for a scene in a field of view (FOV) of the camera of the electronic device, identify an object in the FOV based on the context data; and provide instructions or operate the camera based on the object identified.

Optionally, the electronic device can also have an output screen configured to display the FOV of the camera, and to obtain the context data, the one or more processors are further configured to obtain a manual input related to the object from the output screen. In one aspect, the electronic device includes a sensor in communication with the one or more processors, and to obtain the context data, the one or more processors are further configured to obtain the context data from the sensor. In another aspect, the sensor can be at least one of the camera, a microphone, or a navigation sensor. In one example, the electronic device can also include a database in communication with the one or more processors and the one or more processors can select candidate objects within the FOV and compare the candidate objects to database objects in the database. In another example, the electronic device can include a transceiver in communication with the one or more processors and the one or more processors can select candidate objects within the FOV and communicate over a network regarding at least one candidate object of the candidate objects in response to no match being found between the at least one candidate object and the database objects. In yet another example, the one or more processors can display the instructions on an output screen of the electronic device in response to identifying the object. Alternatively, the one or more processors can vary operation of the camera in response to identifying the object.

In accordance with embodiments herein, a computer program product for managing a camera of an electronic device based on context data is provided. The computer program product can include a non-signal computer readable storage medium comprising computer executable code to obtain the context data for a scene in a field of view (FOV) of the camera of the electronic device and identify an object in the FOV based on the context data. The computer executable code to also provide instructions or operating the camera based on the object identified. Optionally, the non-signal computer readable storage medium can also include computer executable code to vary operation of the camera in response to identifying the object.

DETAILED DESCRIPTION

Figure 1:
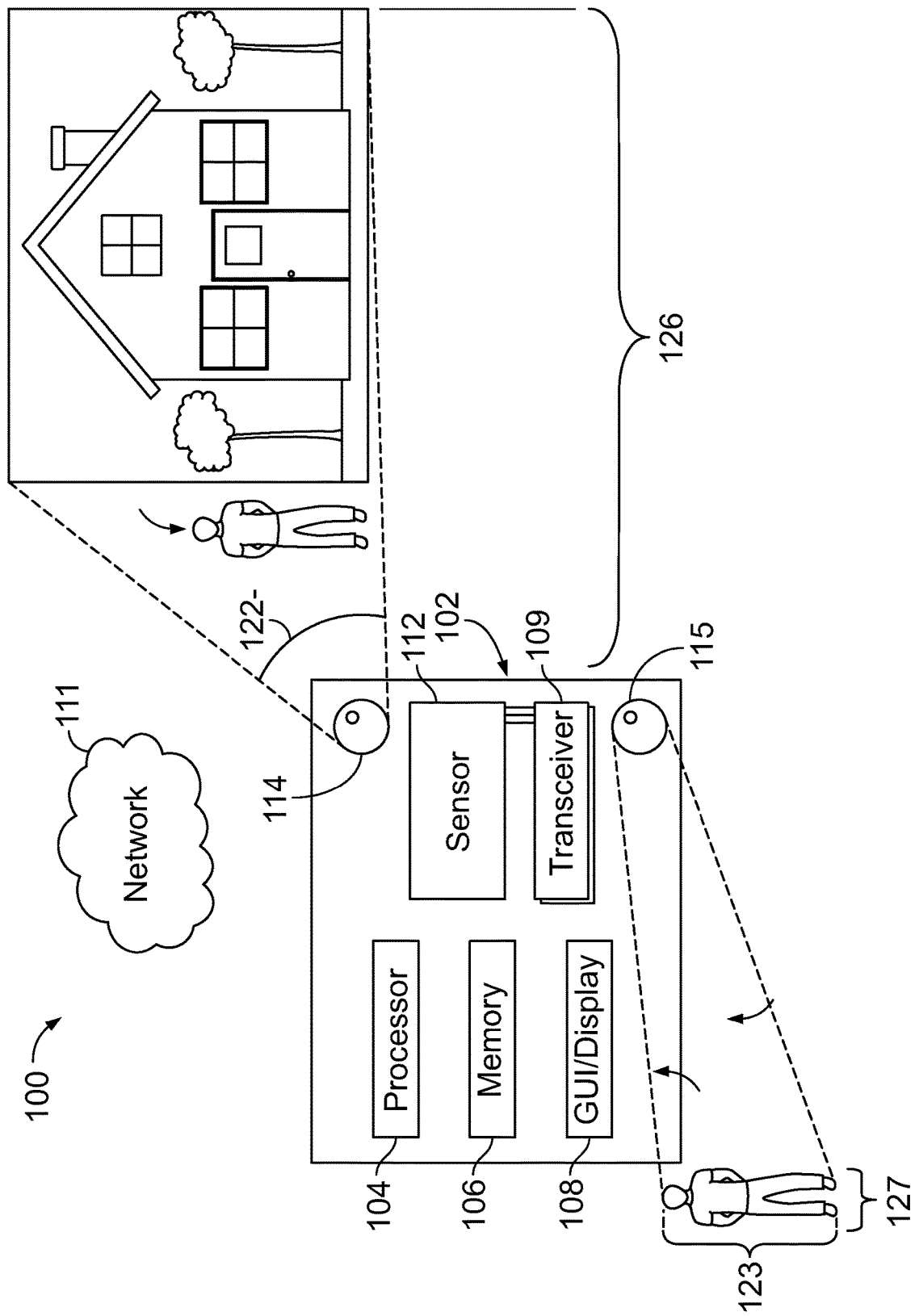
FIG. 1 illustrates an example system for capturing images in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Terms

The term "image data" shall mean information associated with image data related to one or more of two-dimensional (2-D) images, three-dimensional (3-D) images, panoramic images, still images, and/or video images, including associated audio data.

The term "context data" shall mean data and information collected by the device, including location data (e.g., GPS data), calendar data, event data, proximity data (e.g., proximity to other device users or to geographic locations of interest), object recognition data, emotion data, and the like. The context data shall include information determined by the device based on analysis of image data, such as an identification of individuals, locations, objects, monuments, landmarks, etc., in the image data based on image recognition analysis of the image data. In one non-limiting example, proximity data may include information indicative of a distance or spacing between a user of the and a device associated with a family member (e.g., a child, a sibling, a parent), a friend, monument, landmark, building, or the like. In another non-limiting example, proximity data may include information indicative of a distance or spacing between a user and a geographic location of interest (e.g., Niagara Falls, the Louvre, a party or concert venue, a home of a family member or friend). In another non-limiting example, object recognition data may include face recognition data (e.g., of a child, sibling, parent, friend, or the like), object-based location recognition data (e.g., the Eiffel Tower, the Taj Mahal, Mount Rushmore, etc.), or object-based event recognition data (e.g., party balloons, fireworks, roller coasters, etc.). In another non-limiting example, event data may include data gleaned from one or more of email (e.g., receipts for plane tickets, hotel reservation confirmation, etc.), voicemail (e.g., voicemail transcriptions mentioning parties, vacations, etc.), and calendar data. Proximity data, object recognition data, object-based location recognition data, event data, etc. are all examples of context data.

The term "instruction" and "instructions" when presented in relation to a user of an electronic device shall mean any and all communication provided by the electronic device provided to have the user or another to provide an action. The instruction can be a written instructions that is a sentence, a word, several words, a symbol such as an arrow, an auditory phrase, statement, etc., a vibration, an example image, or the like.

In accordance with embodiments herein, systems and methods are provided for capturing image data with an electronic device. The electronic device obtains image data, context data, or the like through manual inputs, sensor inputs, etc. to identify objects in the image data. Then, based on the context data, a camera application provides instructions to the user of the electronic device related to actions for obtaining an image of the object. Alternatively, the camera application can cause one or more processors to automatically vary or adjust the camera of the electronic device to improve the capture of the object in the image.

FIG. 1 illustrates a system 100 for capturing image data, including images, video, and the like. The system 100 includes an electronic device 102 that may be stationary or portable/handheld. The electronic device 102 can be a smartphone, tablet, laptop computer, personal assistant device, etc. The electronic device 102 includes, among other things, a processor 104, local storage medium 106, and a user interface (including a display) 108.

The electronic device 102 can also include a housing that holds the processor 104, local storage medium 106, user interface 108. In one example, the user interface 108 can include a touch screen that can be utilized by a user for selecting objects, monuments, individuals, or the like that are displayed on the touchscreen. The electronic device 102 can also include a transceiver 109 that utilizes communication pathway to communicate data and information to and from the electronic device. In one example, the transceiver can communicate wirelessly over a network 111 through at least one protocol. Such wireless communications can include cellular, Bluetooth, over the air, WiFi, or the like.

The housing can also include one or more sensors 112 for receiving context data and information related to an environment. These sensors 112 can include a microphone, camera, accelerometer, or other positioning sensor, or the like. In this manner the sensors 112 can obtain context data including user context data, environment context data, etc. related to the user and environment for use by the electronic device 102. For example, the microphone can be utilized for voice commands, to detect one or more voices, etc. Meanwhile, the camera 114, 115 can obtain image data 126, 127 related to a user or the environment surrounding the user, including landmarks, monuments, etc. that can be used to determine a location of the electronic device, an activity of the user, or the like. Meanwhile, a sensor 112 such as the positioning sensor can be utilized to obtain electronic device context data related to the positioning, tilt, angle, etc. of the electronic device itself.

The electronic device 102 can additionally include hardware and/or software applications that provide instructions that the processor implements to operate the electronic device 102. These application can include a GPS application, a camera application, or the like. The electronic device 102 operates under control of the processor 104 using the camera application to capture image data for a scene in a FOV 122. In one example, the electronic device 102 can have a both a front facing camera 114 that has a first front FOV 122 and a rear facing camera 115 with a second, rear facing FOV 123 where the camera application is utilized to operate both cameras. In other example embodiments, the electronic device 102 only includes one camera.

The camera application can provide instructions to the processor 104 for operation of the electronic device 102 when capturing image data, including when taking pictures or video with the camera 114, 115. In one example, the camera application allows a user to provide one or more inputs related to a desired image the user desires to capture. The input can be the name of a person, the name of the user, the name of a monument, location, object, etc., a selected area of a touchscreen, a selected object on a touchscreen, a selected person or people on a touchscreen, or the like. In another example, the camera application can include instructions so that the processors utilize context data obtained from sensors 112 to make a determination related to objects, monuments, individuals, etc. that are the focus to be captured by the camera 114, 115 during image capturing operation.

In addition to allowing the selection of objects, people, etc. as inputs, in addition, once one or more objects, people, etc. are identified, the camera application enables the processor 104 to provide instructions to a user regarding an image to be captured. For example, if an individual is taking a selfie with a monument in the background, the camera application can make a determination regarding where the best location to stand is to get the best image capture. In particular, determination can be made regarding whether the monument is being blocked in the image, whether glare is provided, etc. Then, based on the determination the electronic device 102 can provide instructions to the user. Instructions can include arrows on an output screen that show the user a direction to move. Alternatively, a zoom function can be automatically operated to provide an improved image. In yet another example a pop up, auditory instruction, or the like can provide instructions for movement of the electronic device to provide a better image captured.

In another example, the camera application can include a setting that provides suggested photos. For example, suggestions can be utilized that cause a silly or humorous image such as the Eiffel Tower being a hat, or an image where it appears a person is holding a monument, building, landmark, etc. in their hand, or other arrangements. To this end, the camera application can include numerous settings such as vacation setting, humor settings, glare settings, etc. that can be selected by a user to address or have the camera 114, 115 operate as desired depending on the choices of the user.

FIGS. 2-5 illustrate example images to be captured utilizing the system and methods described herein. In one example, the system of claim 1 is utilized to create the images and instructions provided in FIGS. 2-5. In another example, the method of FIG. 6 is utilized to create the images and instructions provided in FIGS. 2-5.

Figure 2:
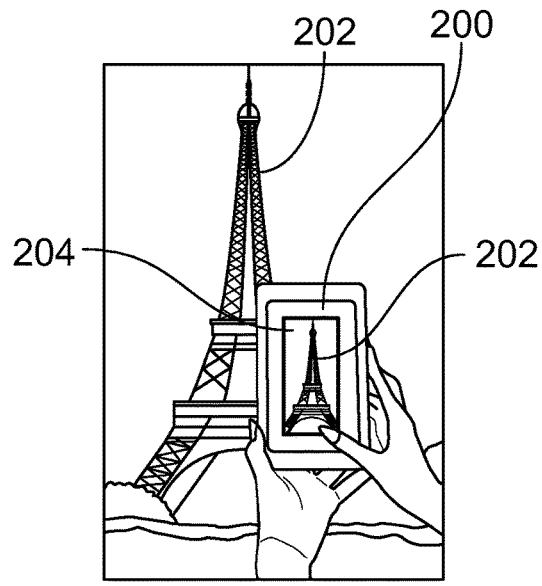
FIG. 2 illustrates an example image or video to be captured in accordance with an embodiment herein.

FIG. 2 illustrates an example image 200 that can be taken utilizing a camera application when image data is obtained. In this example, a person desires to take a picture of an object 202 that in the Figure is the Eiffel Tower. In one embodiment, the user of the electronic device can select the object 202 by forming a selected area 204 in which at least a portion of the object 202 is located. The selecting can occur by the user touching a part of the monument and the entire monument being selected. Alternatively, the monument can be circled or enclosed by a user and the camera application provides instructions to the processors to select the monument.

From the selected area, the camera application can operate the electronic device to determine the object selected. In one example, the camera application includes database with images of database objects, including monuments, buildings, landmarks, historic sites, or the like, and an image search of the database may be conducted to match the object 202 with a known object in the database. Alternatively, if a candidate object in the selected area cannot be identified in the database, the electronic device may communicate over a network to match and identify the object.

In yet another embodiment the camera application includes instructions to utilize context data, such as a GPS location, calendar information obtained from a file on the electronic device that indicates "trip to Eiffel Tower" on the date the image is being taken, or the like in association with an object finding algorithm, to automatically select the object in the FOV. Alternatively, a user may manually input the identity of the object selected. To this end, a user can input an address, name of an object (e.g., "the Eiffel Tower"), or the like to facilitate identification of the object by the camera application. In this manner, objects can be quickly identified by the camera application.

Figure 3:
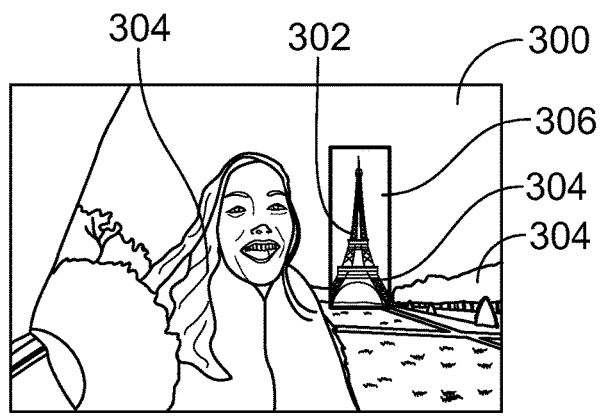
FIG. 3 illustrates an example image or video to be captured in accordance with an embodiment herein.

FIG. 3 illustrates another example image 300 that can be taken utilizing a camera application when image data is obtained. In this example, the object 302 again is the Eiffel Tower, where a user is taking a selfie with the Eiffel Tower in the background. In this example, the image application analyzes the image to be obtained and identifies candidate objects 304 within the image area 306. Once candidate objects 304 are identified, the camera application operates the electronic device to search for the candidate objects as previously described. For example, the candidate object 304 can be compared to a database object in the database of the electronic device. If a candidate object 304 is identified from the database as a monument, landmark, or other point of interest, then the candidate object 304 is automatically selected and identified by the camera application as an object 302. Once selected and identified, determinations are made regarding the location of the user for a better image capture, zoom characteristics may be modified, or the like to adjust and modify the camera of the electronic device to provide a better image. In this manner, both the individual and the object are provided in focus for the image capture.

Figure 4:
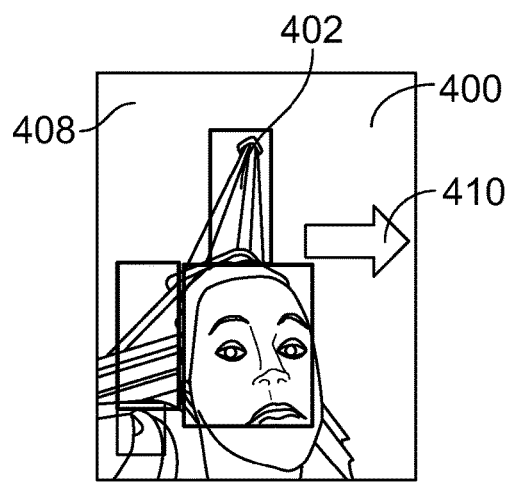
FIG. 4 illustrates an example image or video to be captured in accordance with an embodiment herein.

FIG. 4 illustrates another example image 400 that can be taken utilizing a camera application when image data is obtained. In this example, the object 402 is once again the Eiffel Tower. In this Figure, the object 402 (e.g., Eiffel Tower) has already been identified; however, the user is not in a desired location for image capture. In the image 400 illustrated, the head of the individual is partially covering the object 402. As a result, the output screen 408 provides instructions 410 for the individual to modify image capture. Here, the instruction 410 is illustrated as an arrow pointed in a direction for the individual to move so the head of the individual is no longer in the way. Alternatively, a suggested repositioning of the electronic device could be instructed. Still, the camera application is able to identify the object 402 and then provide instructions 410 for improving an image captured by the individual that includes the object.

Figure 5:
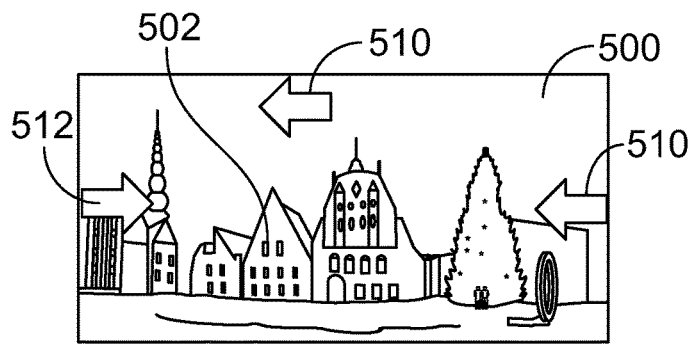
FIG. 5 illustrates an example image or video to be captured in accordance with an embodiment herein.
Figure 6:
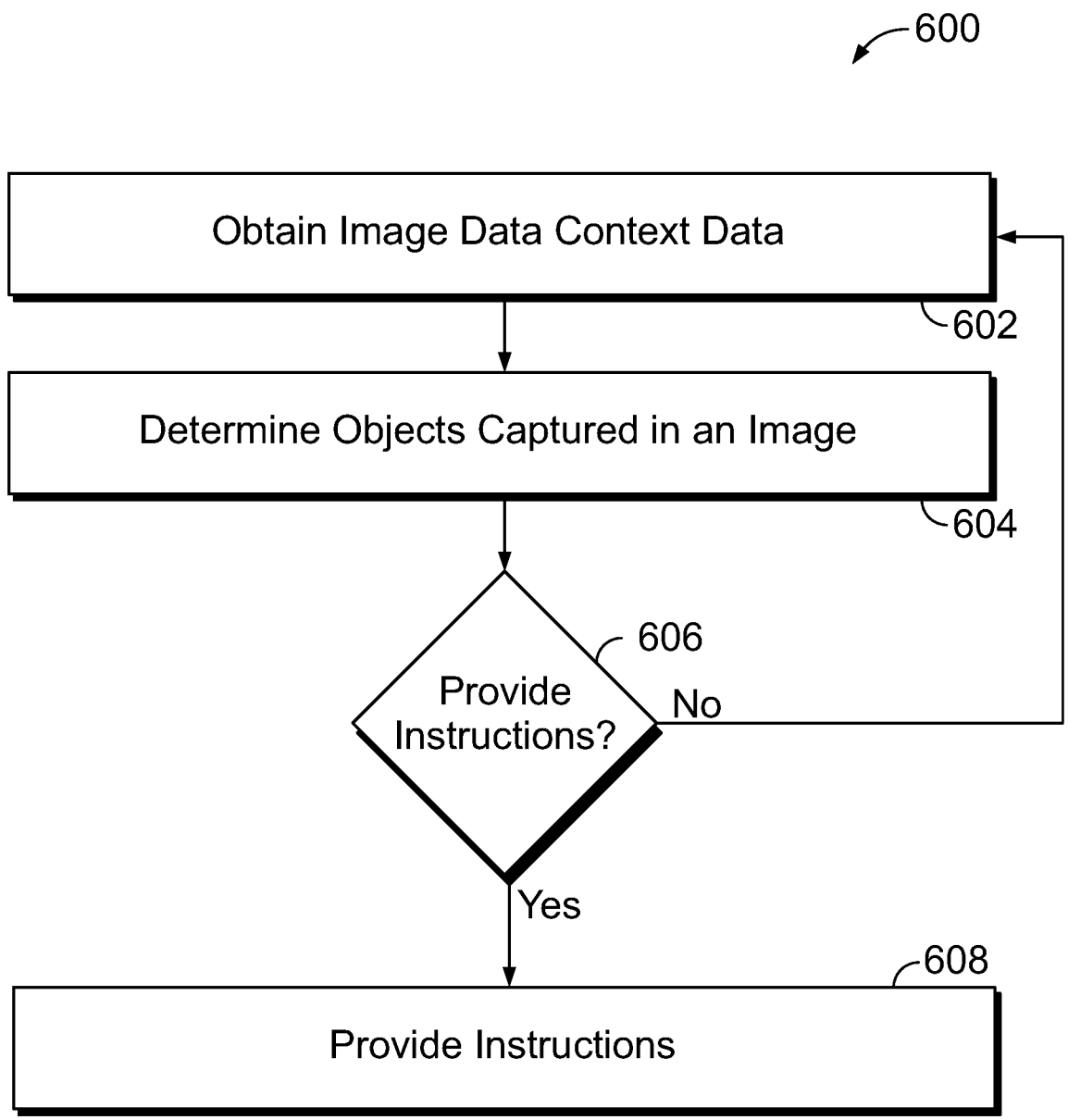
FIG. 6 illustrates an example process for capturing images in accordance with embodiments herein.

FIG. 5 illustrates another example image 500 that can be taken utilizing a camera application when image data is obtained. In this example, the object 502 is a famous cathedral that is surrounded by other buildings in the environment. In such an example, the name of the cathedral could have been inputted into the electronic device as an input for a camera application. As a result, the camera application can be utilized to identify the cathedral and provide instructions 510, 512 for a better image capture. In this example, a first set of instructions 510 are illustrated as two arrows on either side of the output screen that indicate to a user that the user should be zooming in. The second instruction 512 is an arrow at the top of the output screen indicating that the user should be moving the camera to the left to get a better image. Thus, as a result of using the camera application, a better image is captured than if the camera application was not utilized.

FIG. 6 illustrates a process for capturing an image utilizing a camera application in accordance with embodiments herein. The operations of FIG. 6 are carried out by one or more processors in response to execution of program instructions, such as illustrated in the system of FIG. 1. Optionally, all or a portion of the operations of FIG. 6 may be carried out without program instructions, such as in an image signal processor that has the corresponding operations implemented in silicon gates and other hardware. It should be recognized that while the operations of method 600 are described in a somewhat serial manner, one or more of the operations of method 600 may be continuous and/or performed in parallel with one another and/or other operations of the electronic device.

At 602, the one or more processors obtain image data and context data related to a candidate image to be captured. The context data can be received via a manual input by a user. Such manual input can include the name of a person, monument, location, statute, landmark, address, or the like. Alternatively, the context data can be captured automatically by one or more sensors of the electronic device. This context data can include image data from a camera, sound data from a microphone, location data from a global navigation system, etc. In yet another example, context data can be obtained by secondary electronic devices in the local environment that are in communication with the electronic device. In each instance, context data related to the user, environment, object to be captured in an image is obtained.

At 604, the one or more processors determine objects that are to be captured in an image based on the image data obtained. The objects can be people, buildings, monuments, landmarks, vehicles, statutes, or the like that are to be captured by camera of the electronic device. The determination can be made based on the context data obtained. Such context data obtained includes objects that are selected by a user as a result of a manual input. Alternatively, the objects in a candidate image can be identified by capturing the object with the camera and comparing the object to a database, by utilizing an AI algorithm to identify the object, by using additional context data, by utilizing a mathematical model, by utilizing a decision tree, etc.

At 606, the one or more processors determine whether to provide an instruction to the user, or vary the operation of the camera based on the objects within the FOV of the camera. The one or more processors can determine is an object is being partially blocked, if an angle is going to cause undesired glare, if an object is being partially cutoff from the FOV, or the like. Alternatively, the one or more processors can vary the focus of the camera, vary resolution, vary other characteristics, etc. of the camera to improve the quality of the objects captured in the image.

If at 606, instructions or operation changes are not needed, the image can be captured, and the no further action is taken. However, if at 606, instructions or operation changes are required, then at 608, the one or more processors can provide instructions to the user for varying the image capture, the camera can automatically vary operation to vary the image capture, or both. In example embodiments, the instructions can include arrows on a touch screen, auditory instructions, word or phrase bubbles on the output screen, example movements presented on the output screen, or the like. Each is a manner to instruct or communicate with the user of how to vary the electronic device to capture a better image than if no instructions are provided. In addition, components of the camera, such as the lens, can automatically be varied to also provide an improved image capture compared to if no variance occurred. The one or more processes continue to provide instructions or vary the camera until an ideal image capture is achieved, or the user decides to capture the image.

CONCLUSION

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", "one or more of A or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method for capturing images with an electronic device, the method comprising:
   under control of one or more processors configured with specific executable program instructions:
   obtaining image data;
   obtaining context data related to the user of the electronic device for a scene in a field of view (FOV) of a camera of an electronic device based on the image data obtained;
   identifying an object in the FOV based on the context data; and
   providing instructions related to the FOV or operating the camera to adjust the FOV based on the object identified;
   wherein the context data related to the user of the electronic device is selected from a group consisting of face recognition data, calendar information obtained from a file on the electronic device, email-based data, or voicemail-based data.

2. The method of claim 1, wherein obtaining the context data comprises obtaining a manual input related to the object.

3. The method of claim 2, wherein the manual input is provided by touching an output screen of the electronic device.

4. The method of claim 2, wherein obtaining the context data comprises obtaining the context data from a sensor of the electronic device.

5. The method of claim 1, wherein identifying the object in the FOV comprises selecting candidate objects within the FOV and comparing the candidate objects to database objects in a database of the electronic device.

6. The method of claim 1, wherein identifying the object in the FOV comprises selecting candidate objects within the FOV and communicating over a network regarding at least one candidate object of the candidate objects.

7. The method of claim 1, wherein providing instructions or operating the camera based on the object identified comprises displaying the instructions on an output screen, wherein the instructions comprise at least one of a symbol, an arrow, a word, or a phrase.

8. The method of claim 1, wherein providing instructions or operating the camera based on the object identified comprises varying operation of the camera.

9. The method of claim 8, wherein varying the operation of the camera includes varying focus of the camera.

10. The method of claim 1, wherein the calendar information includes a date that matches a date on which the image data is obtained.

11. An electronic device for capturing images, comprising:
    a camera;
    one or more processors;
    a memory storing program instructions accessible by the one or more processors, wherein, responsive to execution of the program instructions, the one or more processors perform the following:

obtain image data;

obtain context data related to a user of the electronic device for a scene in a field of view (FOV) of the camera of the electronic device based on the image data obtained;

identify an object in the FOV based on the context data; and provide instructions related to the FOV or operate the camera to adjust the FOV based on the object identified;

wherein the context data related to the user of the electronic device is selected from a group consisting of face recognition data, calendar information obtained from a file on the electronic device, email-based data, or voicemail-based data.

12. The electronic device of claim 11, further comprising an output screen configured to display the FOV of the camera; and wherein to obtain the context data, the one or more processors are further configured to obtain a manual input related to the object from the output screen.

13. The electronic device of claim 11, further comprising a sensor in communication with the one or more processors; and wherein to obtain the context data, the one or more processors are further configured to obtain the context data from the sensor.

14. The electronic device of claim 13, wherein the sensor is at least one of the camera, a microphone, or a navigation sensor.

15. The electronic device of claim 11, further comprising a database in communication with the one or more processors; and wherein the one or more processors are further configured to select candidate objects within the FOV and compare the candidate objects to database objects in the database.

16. The electronic device of claim 15, further comprising a transceiver in communication with the one or more processors; wherein the one or more processors are further configured select candidate objects within the FOV and communicate over a network regarding at least one candidate object of the candidate objects in response to no match being found between the at least one candidate object and the database objects.

17. The electronic device of claim 11, wherein the one or more processors are further configured to display the instructions on an output screen of the electronic device in response to identifying the object.

18. The electronic device of claim 11, wherein the one or more processors are further configured to vary operation of the camera in response to identifying the object.

19. A computer program product for managing a camera of an electronic device based on context data, the computer program product comprising a non-signal computer readable storage medium comprising computer executable code to:

obtain image data;

obtain the context data related to a user of the electronic device for a scene in a field of view (FOV) of the camera of the electronic device based on the image data;

identify an object in the FOV based on the context data; and provide instructions related to the FOV or operate the camera to adjust the FOV based on the object identified;

wherein the context data related to the user of the electronic device is selected from a group consisting of face recognition data, calendar information obtained from a file on the electronic device, email-based data, or voicemail-based data.

20. The computer program product of claim 19, wherein the non-signal computer readable storage medium further comprises computer executable code to:

vary operation of the camera in response to identifying the object.

* * * * *